United States Patent [19]

Verlijsdonk et al.

[11] Patent Number: 4,963,787

[45] Date of Patent: Oct. 16, 1990

[54] LUMINESCENT ALKALINE EARTH METAL ORTHOSILICATE, LUMINESCENT SCREEN PROVIDED WITH SUCH A SILICATE AND LOW-PRESSURE MERCURY VAPOR DISCHARGE LAMP PROVIDED WITH SUCH A SCREEN

[75] Inventors: Johannus G. Verlijsdonk; Bruno M. J. Smets, both of Eindhoven, Netherlands

[73] Assignee: U.S. Philips Corporation, New York, N.Y.

[21] Appl. No.: 469,127

[22] Filed: Jan. 24, 1990

[30] Foreign Application Priority Data

Feb. 15, 1989 [NL] Netherlands ............................ 8900364

[51] Int. Cl.$^5$ .............................................. C09K 11/59
[52] U.S. Cl. .............................. 313/486; 252/301.4 F; 428/690
[58] Field of Search ............... 252/301.4 F; 313/486; 428/690

[56] References Cited

U.S. PATENT DOCUMENTS

| | | |
|---|---|---|
| 3,373,302 | 3/1968 | Barber ............................ 252/301.4 F |
| 3,557,014 | 1/1971 | Beals et al. ..................... 252/301.4 F |
| 4,215,289 | 7/1980 | De Hair et al. ................ 252/301.4 F |
| 4,495,085 | 1/1985 | Hashimoto et al. ........... 252/301.4 F |
| 4,539,138 | 9/1985 | Miyahara et al. .............. 252/301.4 F |

FOREIGN PATENT DOCUMENTS

| | | |
|---|---|---|
| 873793 | 6/1971 | Canada ........................... 252/301.4 F |
| 59-193983 | 11/1984 | Japan ............................... 252/301.4 F |
| 641212 | 8/1950 | United Kingdom ........... 252/301.4 F |

OTHER PUBLICATIONS

Bondar et al., "Izvestia Akademia Nauk SSSR", vol. 33, No. 6, pp. 1057–1061, 1969.

*Primary Examiner*—Jack Cooper
*Attorney, Agent, or Firm*—John C. Fox

[57] ABSTRACT

Luminescent alkaline earth metal orthosilicate activated by praseodymium, defined by the formula $M_{2-3/2x-\frac{1}{2}y}Pr_xM'_ySiO_4$ in which M is at least one of the elements Ca and Sr of which up to 50 mol % may be replaced by Ba and/or of which up to 20 mol % may be replaced by Mg, in which M' is at least one of the elements Li, Na and K and in which $0.004 \leq x \leq 0.10$ and $0 \leq y \leq 0.10$.

4 Claims, 1 Drawing Sheet

LUMINESCENT ALKALINE EARTH METAL ORTHOSILICATE, LUMINESCENT SCREEN PROVIDED WITH SUCH A SILICATE AND LOW-PRESSURE MERCURY VAPOR DISCHARGE LAMP PROVIDED WITH SUCH A SCREEN

BACKGROUND OF THE INVENTION

The invention relates to a luminescent alkaline earth metal orthosilicate activated by a rare earth metal. The invention also relates to a luminescent screen provided with such a silicate and to a low-pressure mercury vapour discharge lamp provided with such a screen.

It is known from British patent specification No. 544,160 that bivalent europium can be used as an activator in orthosilicates of calcium, barium and strontium. Dependent on the selected alkaline earth metal or alkaline earth metal mixture, emission in the green, yellow or blue part of the spectrum occurs upon excitation by ultraviolet radiation.

U.S. Pat. No. 3,260,675 describes the activation of orthosilicates of calcium and magnesium by terbium. Line emission in the green part of the spectrum takes place upon excitation by ultraviolet radiation. The Patent states that the terbium may be partly replaced by other rare earth metal activators, for example, samarium or dysprosium.

Activation of $Ca_2SiO_4$ by dysprosium is known from U.S. Pat. No. 4,495,085. The luminescent material is intended for use in cathode ray tubes and emits white light upon excitation by an electron beam.

The activation of $Ca_2SiO_4$ by cerium is known from the book by F. A. Kroger, "Some Aspects of the luminescence of Solids", 1948, page 288. The luminescence colour is blue.

OBJECT AND SUMMARY OF THE INVENTION

It is an object of the invention to provide efficiently luminescing materials which are particularly suitable for use in low-pressure mercury vapour discharge lamps for UV-irradiation purposes having a germicidal activity. Such lamps are used, for example, for disinfecting air, water and medical instruments.

According to the invention a luminescent alkaline earth metal orthosilicate activated by a rare earth metal is characterized in that the silicate is activated by $Pr^{3+}$ and is defined by the formula $M_{2-3/2x-\frac{1}{2}y}Pr_xM'_ySiO_4$ in which M is at least one of the elements Ca and Sr of which up to 50 mol % may be replaced by Ba and/or of which up to 20 mol % may be replaced by Mg, in which M' is at least one of the elements Li, Na and K and in which $0.004 \leq x \leq 0.10$ and $0 \leq y \leq 0.10$.

It has surprisingly been found that the praseodymium exhibits an efficient band emission in the ultraviolet part of the spectrum upon excitation of the luminescent silicates according to the invention by 254 nm radiation (mercury resonance line).

A limited quantity of the elements Ca and Sr denoted by M may be replaced by Ba (50 mol % maximum) and/or by Mg (20 mol % maximum). There is insufficient luminescence at larger quantities of Ba and Mg.

The elements Li, Na and K denoted by M' may ensure charge compensation as monovalent cations at the partial replacement of bivalent Ca and/or Sr by trivalent Pr.

The praseodymium content x is chosen within the above-mentioned limits. If x is chosen to be smaller than 0.004, materials are obtained which luminesce insufficiently due to a too small absorption of the exciting radiation. For values of x exceeding 0.10 there is also a too weak luminescence due to concentration quenching.

As stated hereinbefore, the lower limit for the content y of the elements Li, Na and K denoted by M' is set at $y=0$ (no charge compensation). In fact, it has been found that efficiently luminescing materials are also obtained without charge compensation. In connection with the charge compensation, the maximum value of the content y follows from the maximum value of the praseodymium content x and is equal thereto. The upper limit of the content y is therefore 0.10.

It also follows from the above-mentioned formula that the concentration y of a charge compensator which is present may differ from the praseodymium concentration x in luminescent silicates according to the invention. In such cases efficiently luminescing materials are also obtained.

A preferred embodiment of a luminescent silicate according to the invention is characterized in that $0.01 \leq x \leq 0.03$ and $y=x$.

Optimum luminescent materials are realised with such relatively low praseodymium concentrations while using equimolar quantities of praseodymium and charge compensator.

The luminescent silicates according to the invention may be obtained by a solid-state reaction at a high temperature. The starting material is a mixture of the composite oxides or of compounds yielding these oxides at elevated temperatures (for example, carbonates). Small deviations (up to 10 mol %) from the stoichiometry of the compound to be formed are admissible in the starting mixture. Generally, a small excess of one or more of the composite elements and/or a flux may promote the reaction.

The starting mixture is heated once or several times for some time at a temperature between 1200° and 1500° C., preferably in a weakly reducing atmosphere in order to maintain or possibly bring the praseodymium into its trivalent state.

Embodiments of luminescent silicates according to the invention, suitable for use in low-pressure mercury vapour discharge lamps, will now be further described with reference to the accompanying drawing and a number of examples of preparation.

DESCRIPTION OF THE PREFERRED EMBODIMENT

Figure 1:
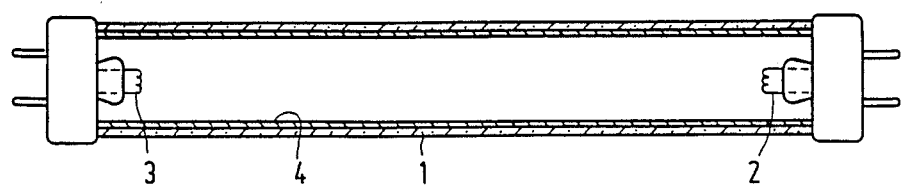
FIG. 1 shows a low-pressure mercury vapour discharge lamp in a longitudinal section, comprising a luminescent screen provided with a $Pr^{3+}$ activated silicate according to the invention.

The low-pressure mercury vapour discharge lamp according to FIG. 1 has a tubular glass wall 1. Electrodes 2 and 3 between which the discharge is maintained during operation are arranged within the lamp and at its ends. The lamp contains a small quantity of mercury and a rare gas as a starter gas. The wall 1 serves as a support for a luminescent layer 4 which comprises a $Pr^{3+}$ activated silicate according to the invention. The wall 1 and the luminescent layer 4 form together a luminescent screen. The layer 4 may be provided on the wall 1 in a conventional manner, for example, by means of a suspension which comprises the luminescent material.

EXAMPLE 1

Figure 2:
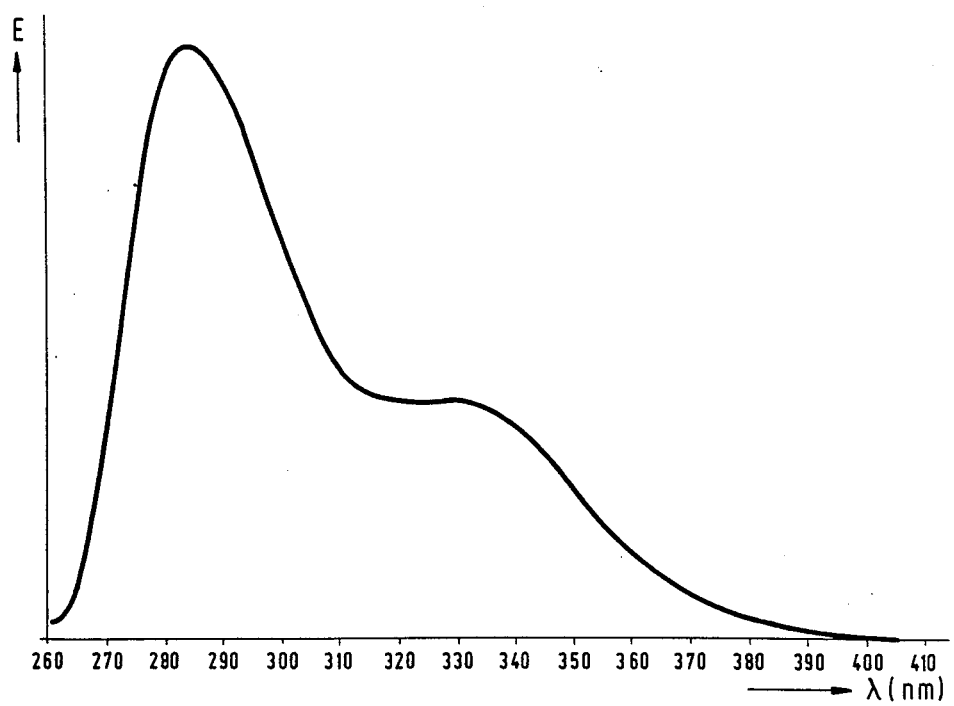
FIG. 2 shows the spectral energy distribution of the radiation emitted by a $Pr^{3+}$ activated silicate according to the invention under 254 nm excitation radiation.

A mixture was made of
10.217 g of $CaCO_3$
1.712 g of $SrCO_3$
3.485 g of $SiO_2$
0.043 g of $Li_2CO_3$
0.191 g of $Pr_2O_3$ This mixture was heated in a furnace for 1 hour at 1400° C. in a weakly reducing atmosphere (a mixture of $N_2$ and several vol. % of $H_2$). After cooling the firing product was ground. Subsequently the firing product was again heated for 1 hour at 1400° C. in the same atmosphere and ground again after cooling. A luminescent silicate activated by $Pr^{3+}$ defined by the formula $Ca_{1.76}Sr_{0.2}Pr_{0.02}Li_{0.02}SiO_4$ was thus obtained. Under 254 nm excitation radiation the quantum efficiency was 51% and the UV absorption was 80%. FIG. 2 shows the emission spectrum of this silicate under 254 nm excitation radiation. The wavelength λ (in nm) is plotted on the horizontal axis and the emitted radiation energy E (in arbitrary units is plotted on the vertical axis. The maximum of the emission spectrum is at 284 nm in the UV-B range (280–315 nm).

EXAMPLES 2 TO 25

In a corresponding manner as described in Example 1 a number of $Pr^{3+}$ activated silicates according to the invention was prepared. The Table below states for these silicates the formula, the quantum efficiency Q (in %), the UV absorption A (in %) of the 254 excitation radiation, the wavelength $\lambda_{max}$ (in nm) at which the emission is maximum and $E_{12-88}$ (in nm). The reference $E_{12-88}$ indicates the width of the uninterrupted wavelength range within which 76% of the total radiation energy is emitted. The other 24% of emitted energy are found outside this range, evenly distributed over 12% at smaller wavelengths and 12% at larger wavelengths.

TABLE

| No. | Formula | Q (%) | A (%) | $\lambda_{max}$(nm) | $E_{12-88}$ (nm) |
|---|---|---|---|---|---|
| 2[a] | $Ca_{1.97}Pr_{0.02}SiO_4$ | 25 | 67 | 283 | 67 |
| 3 | $Ca_{1.992}Pr_{0.004}Li_{0.004}SiO_4$ | 38 | 39 | 271 | 56 |
| 4 | $Ca_{1.988}Pr_{0.006}Li_{0.006}SiO_4$ | 46 | 45 | 274 | 60 |
| 5 | $Ca_{1.98}Pr_{0.01}Li_{0.01}SiO_4$ | 36 | 63 | 273 | 60 |
| 6 | $Ca_{1.968}Pr_{0.016}Li_{0.016}SiO_4$ | 51 | 70 | 275 | 62 |
| 7[a] | $Ca_{1.96}Pr_{0.02}Li_{0.02}SiO_4$ | 49 | 72 | 273 | 63 |
| 8 | $Ca_{1.96}Pr_{0.02}Na_{0.02}SiO_4$ | 41 | 58 | 271 | 61 |
| 9 | $Ca_{1.96}Pr_{0.02}K_{0.02}SiO_4$ | 43 | 58 | 271 | 61 |
| 10 | $Ca_{1.95}Pr_{0.02}Li_{0.04}SiO_4$ | 25 | 82 | 273 | 64 |
| 11 | $Ca_{1.92}Pr_{0.02}Li_{0.10}SiO_4$ | 26 | 82 | 272 | 63 |
| 12 | $Ca_{1.875}Pr_{0.05}Li_{0.10}SiO_4$ | 34 | 86 | 273 | 63 |
| 13 | $Ca_{1.80}Pr_{0.10}Li_{0.10}SiO_4$ | 29 | 87 | 282 | 63 |
| 14[b] | $Ca_{1.66}Sr_{0.3}Pr_{0.02}Li_{0.02}SiO_4$ | 42 | 82 | 284 | 68 |
| 15 | $Ca_{1.46}Sr_{0.5}Pr_{0.02}Li_{0.02}SiO_4$ | 51 | 77 | 283 | 66 |
| 16 | $Ca_{0.98}Sr_{0.98}Pr_{0.02}Li_{0.02}SiO_4$ | 31 | 67 | 281 | 68 |
| 17 | $Ca_{1.76}Ba_{0.2}Pr_{0.02}Li_{0.02}SiO_4$ | 47 | 80 | 284 | 66 |
| 18 | $Ca_{0.98}Ba_{0.98}Pr_{0.02}Li_{0.02}SiO_4$ | 34 | 55 | 284 | 67 |
| 19 | $Ca_{1.76}Mg_{0.2}Pr_{0.02}Li_{0.02}SiO_4$ | 50 | 73 | 281 | 64 |
| 20 | $Ca_{1.36}Sr_{0.2}Br_{0.2}Mg_{0.2}Pr_{0.02}Li_{0.02}SiO_4$ | 53 | 68 | 283 | 67 |
| 21 | $Ca_{0.96}Sr_{0.4}Ba_{0.4}Mg_{0.2}Pr_{0.02}Li_{0.02}SiO_4$ | 35 | 63 | 282 | 67 |
| 22 | $Ca_{1.16}Sr_{0.4}Mg_{0.4}Pr_{0.02}Li_{0.02}SiO_4$ | 31 | 56 | 285 | 68 |
| 23[a] | $Sr_{1.97}Pr_{0.02}SiO_4$ | 30 | 64 | 270 | 61 |
| 24 | $Sr_{1.96}Pr_{0.02}Li_{0.02}SiO_4$ | 39 | 53 | 269 | 59 |
| 25 | $Sr_{0.98}Ba_{0.98}Pr_{0.02}Li_{0.02}SiO_4$ | 35 | 34 | 265 | 56 |

[a] $H_3BO_3$ used as a flux.
[b] 0.1 mol $SiO_2$ excess in the starting mixture.

We claim:

1. A luminescent alkaline earth metal orthosilicate activated by a rare earth metal, characterized in that the silicate is activated by $Pr^{3+}$ and is defined by the formula $M_{2-3/2x-\frac{1}{2}y}Pr_xM'_ySiO_4$ in which M is at least one of the elements Ca and Sr of which up to 50 mol % is replaceable by Ba and/or of which up to 20 mol % is replaceable by Mg, in which M' is at least one of the elements Li, Na and K and in which $0.004 \leq x \leq 0.10$ and $0 \leq y \leq 0.10$.

2. A luminescent silicate as claimed in claim 1, characterized in that $0.01 \leq x \leq 0.03$ and $y = x$.

3. A luminescent screen comprising a support having provided thereon a luminescent silicate as claimed in claim 1 or 2.

4. A low-pressure mercury vapour discharge lamp provided with a luminescent screen as claimed in claim 3.

* * * * *